United States Patent
Kubo

(10) Patent No.: US 11,312,153 B2
(45) Date of Patent: Apr. 26, 2022

(54) PRINT PRODUCT, IMAGE PROCESSING APPARATUS, IMAGE PROCESSING METHOD, AND PROGRAM

(71) Applicant: CANON KABUSHIKI KAISHA, Tokyo (JP)

(72) Inventor: Hideki Kubo, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 217 days.

(21) Appl. No.: 16/831,155

(22) Filed: Mar. 26, 2020

(65) Prior Publication Data
US 2020/0254779 A1 Aug. 13, 2020

Related U.S. Application Data

(63) Continuation of application No. 15/757,319, filed as application No. PCT/JP2016/004031 on Sep. 5, 2016, now abandoned.

(30) Foreign Application Priority Data

Sep. 8, 2015 (JP) .............................. JP2015-177011

(51) Int. Cl.
*B44F 1/14* (2006.01)
*B41J 2/205* (2006.01)
(Continued)

(52) U.S. Cl.
CPC ........... *B41J 2/2114* (2013.01); *B41J 2/2054* (2013.01); *B41J 2/2117* (2013.01); *B42D 25/324* (2014.10);
(Continued)

(58) Field of Classification Search
CPC ...... B41J 2/2114; B41J 2/2054; B41J 2/2117; B41J 2/21; B41J 3/407; B42D 25/324;
(Continued)

(56) References Cited

U.S. PATENT DOCUMENTS 4,932,685 A * 6/1990 Mancuso ............. B42D 25/425
283/91
6,036,233 A * 3/2000 Braun ................... B42D 25/29
283/72

FOREIGN PATENT DOCUMENTS

JP         03122463 U      6/2006
JP      2011045071 A * 3/2011 ............... H04N 1/19
JP      2013-078914 A      5/2013

* cited by examiner

*Primary Examiner* — Yaovi M Ameh
(74) *Attorney, Agent, or Firm* — Canon U.S.A., Inc. IP Division

(57) ABSTRACT

The present invention is directed to obtaining an object having an anisotropic reflection characteristic without using a lenticular lens. A print product including a print medium on which a repetitive structure of projected portions and recessed portions is formed out of image forming materials including a color material includes a first layer formed on surfaces of the projected portions out of a first color material among the image forming materials, and a second layer formed on the recessed portions out of a second color material different from the first color material, wherein the projected portions have a height to occlude part of the second layer when observed at an angle different from an angle formed by a normal to a surface of the print medium.

13 Claims, 13 Drawing Sheets

(51) Int. Cl.
  *B41M 3/14* (2006.01)
  *H04N 1/60* (2006.01)
  *B41J 2/21* (2006.01)
  *B42D 25/324* (2014.01)
  *B42D 25/328* (2014.01)
  *H04N 1/54* (2006.01)
  *H04N 1/46* (2006.01)
  *B41J 3/407* (2006.01)

(52) U.S. Cl.
  CPC .............. *B42D 25/328* (2014.10); *B44F 1/14* (2013.01); *H04N 1/46* (2013.01); *H04N 1/54* (2013.01); *B41J 2/21* (2013.01); *B41J 3/407* (2013.01); *B41M 3/148* (2013.01); *H04N 1/60* (2013.01)

(58) Field of Classification Search
  CPC ........... B42D 25/328; B44F 1/14; H04N 1/46; H04N 1/54; H04N 1/60; B41M 3/148
  See application file for complete search history.

[Fig. 1]
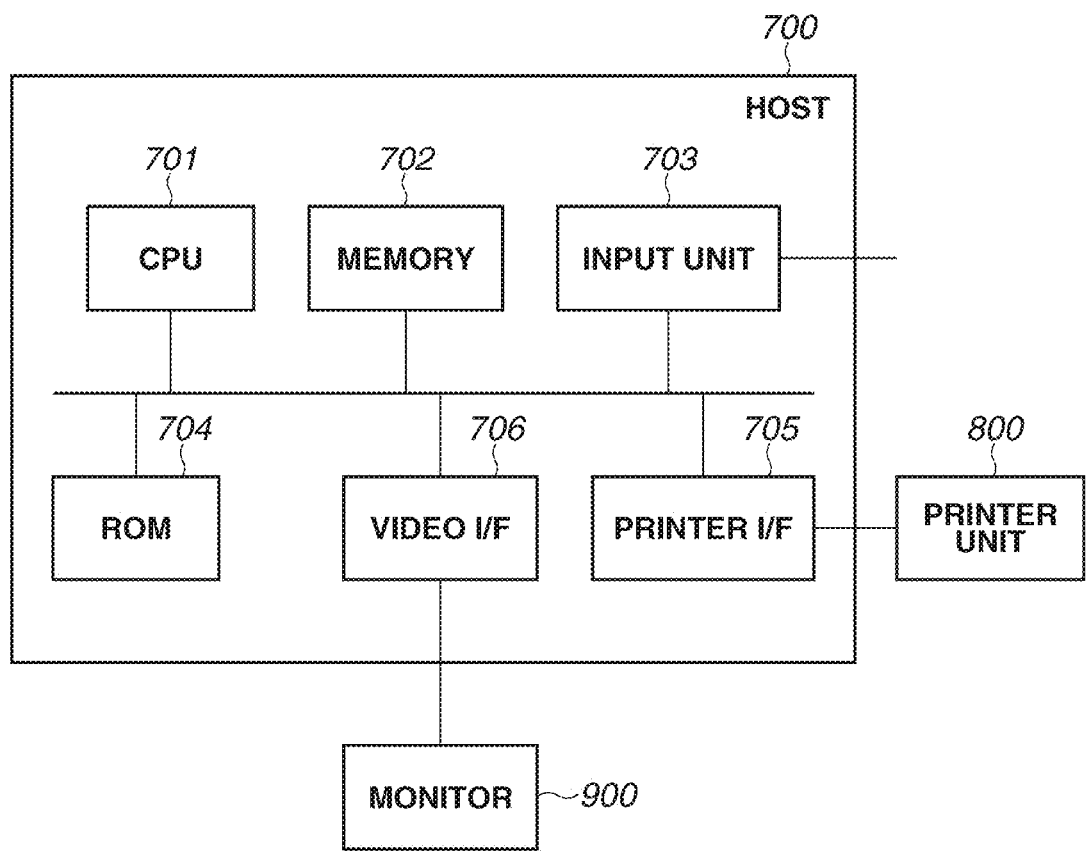

[Fig. 2]
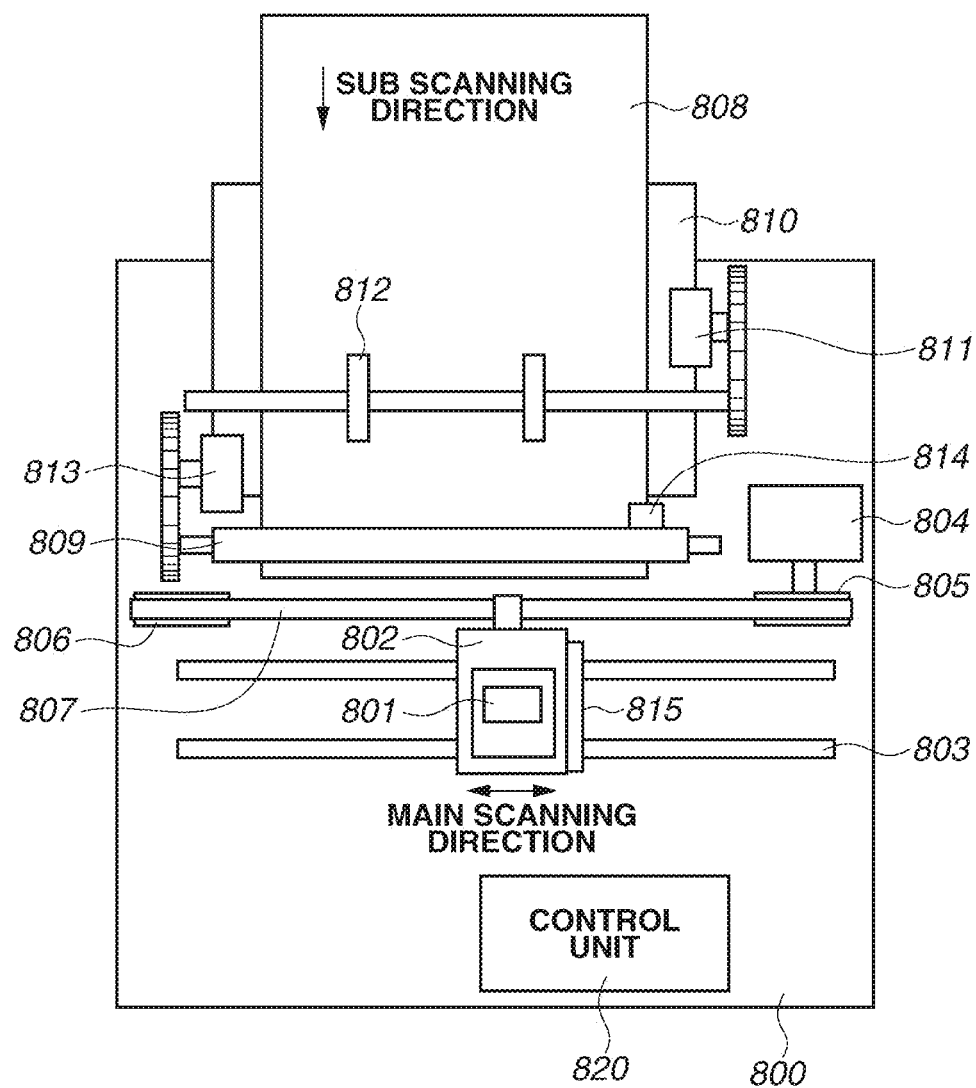
[Fig. 3A]
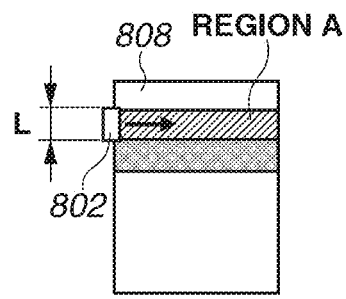

[Fig. 3B]
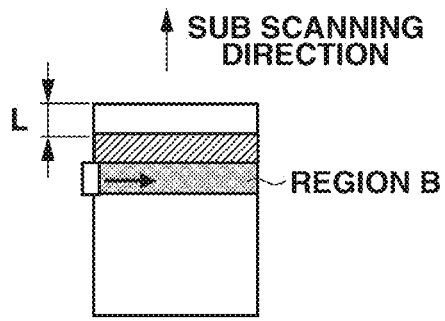
[Fig. 3C]
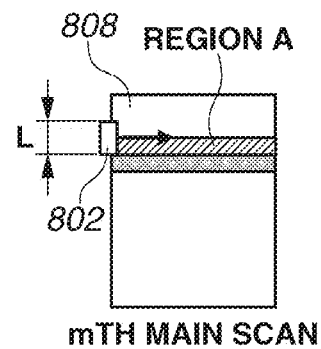
[Fig. 3D]
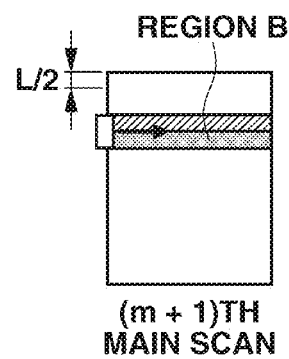
[Fig. 3E]
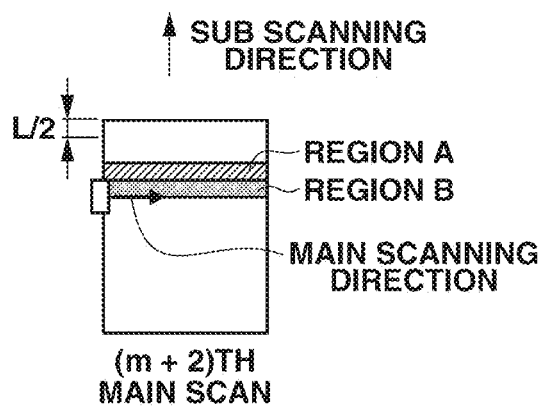

[Fig. 4A]
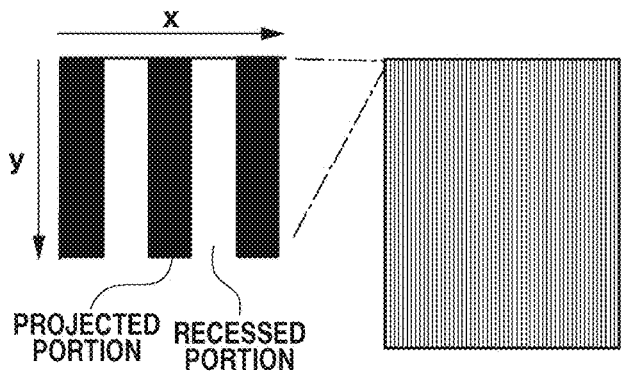
[Fig. 4B]
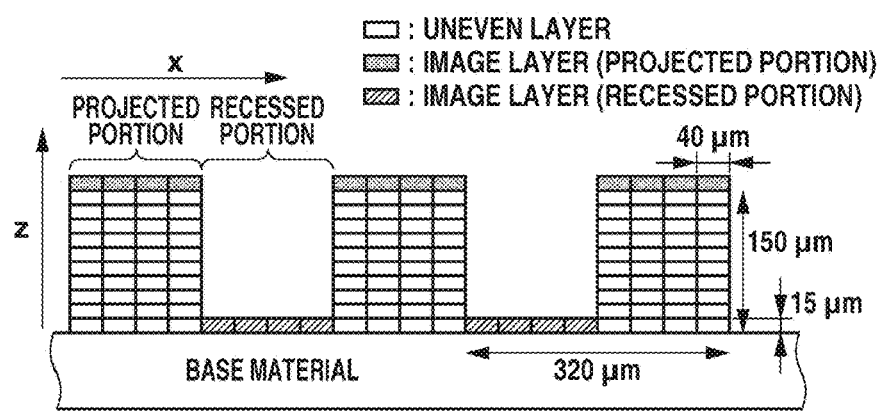
[Fig. 4C]
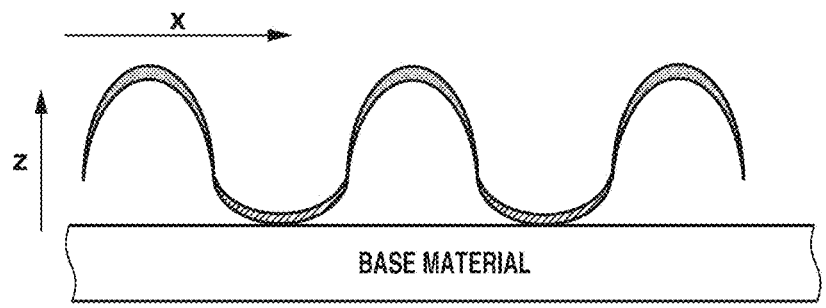
[Fig. 4D]
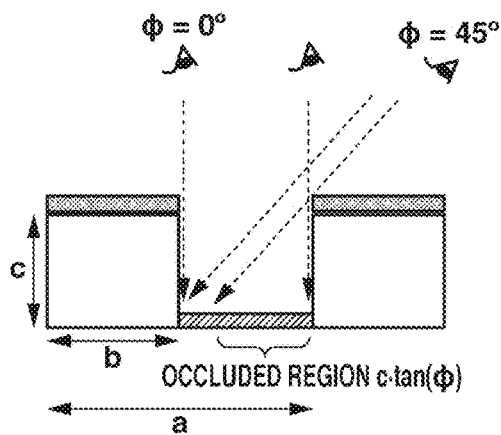

[Fig. 5A]
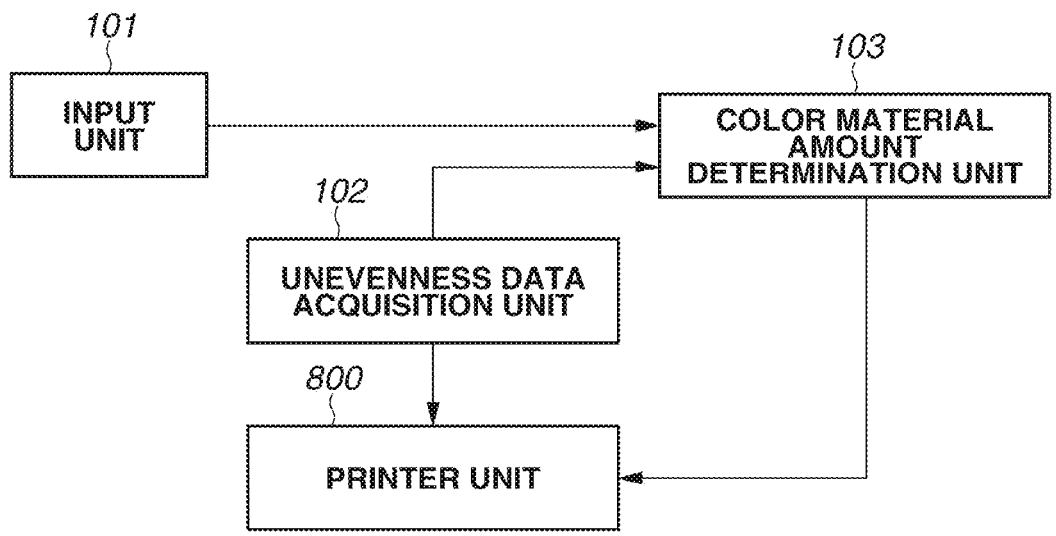
[Fig. 5B]
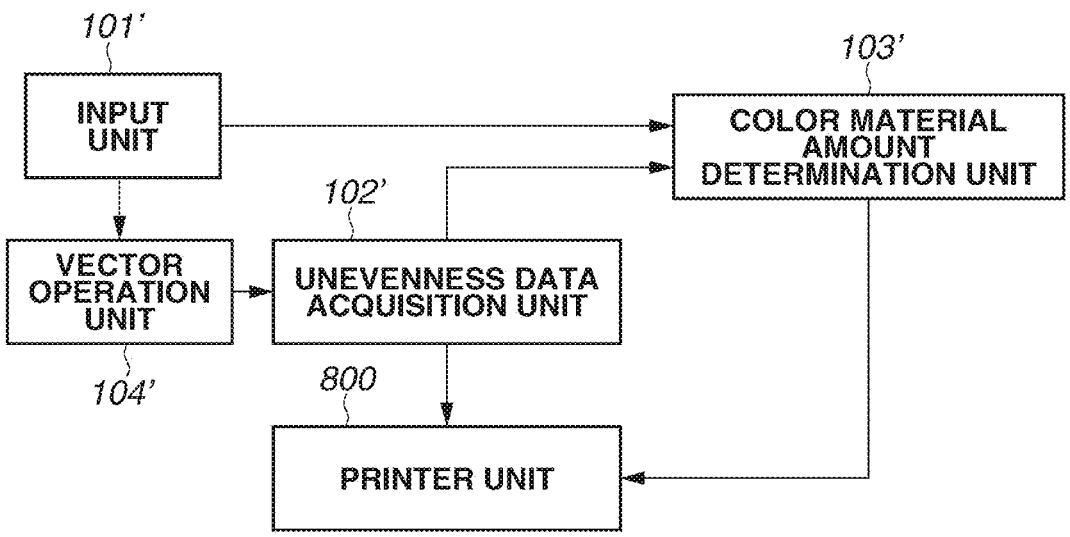

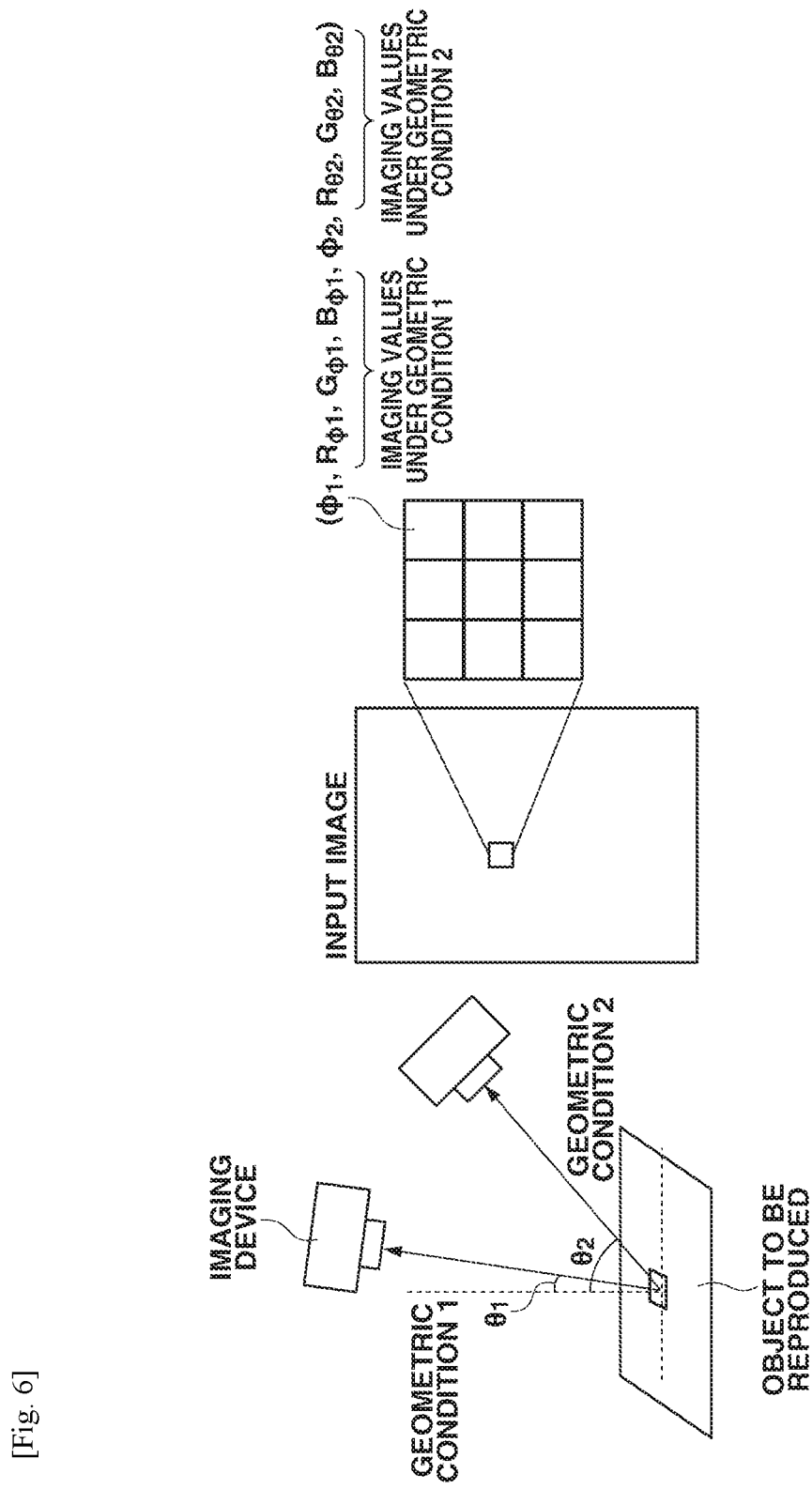
[Fig. 6]

[Fig. 7A]
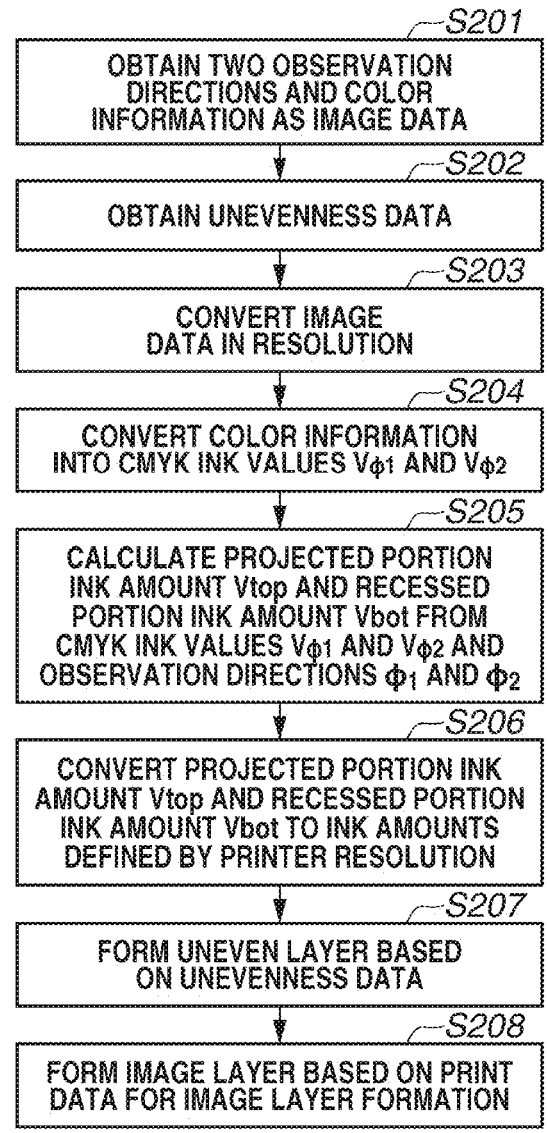

[Fig. 7B]
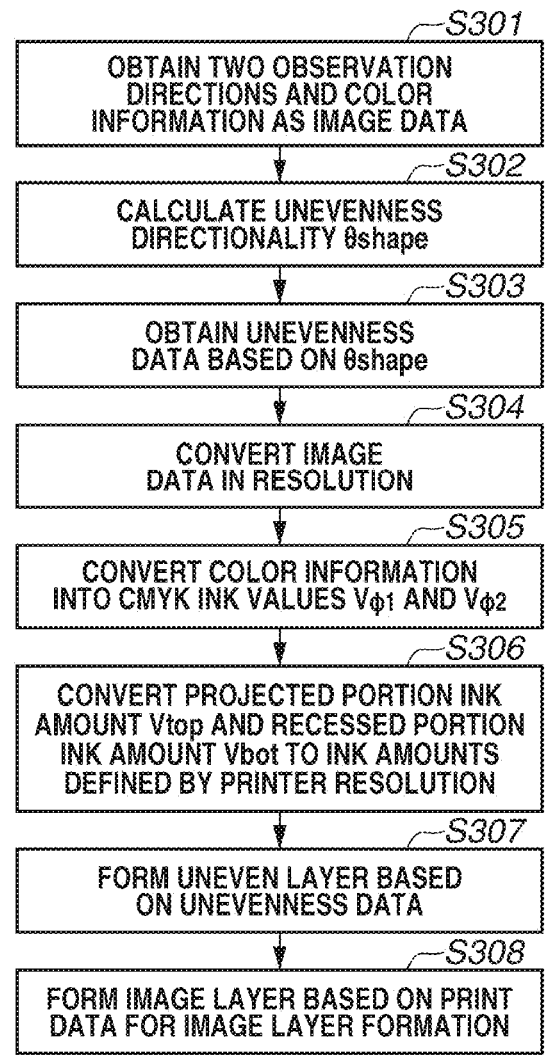

[Fig. 8]
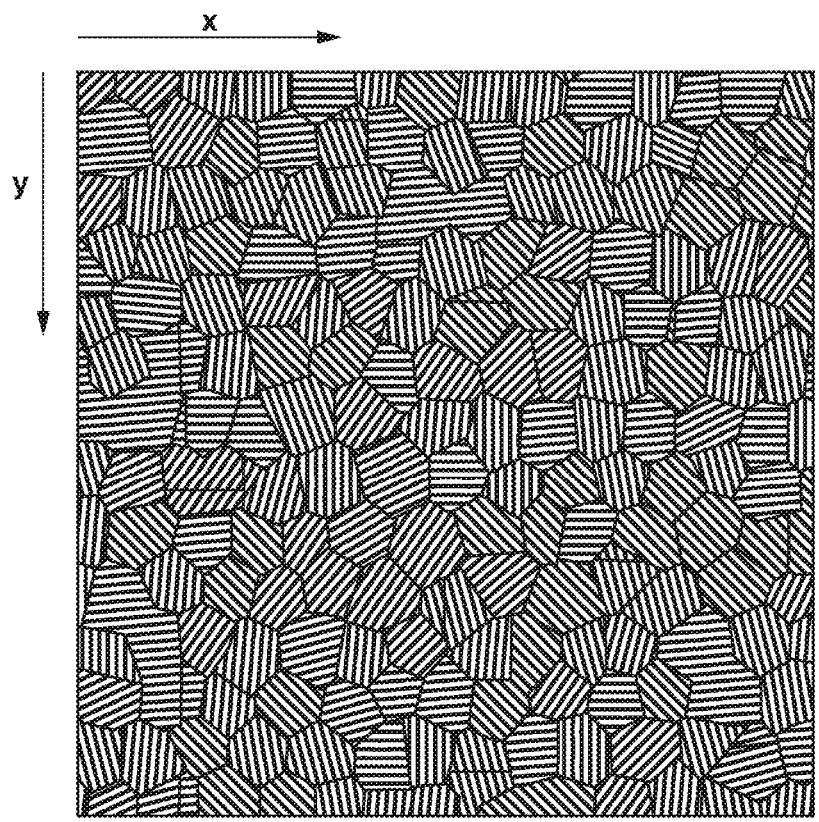
[Fig. 9A]
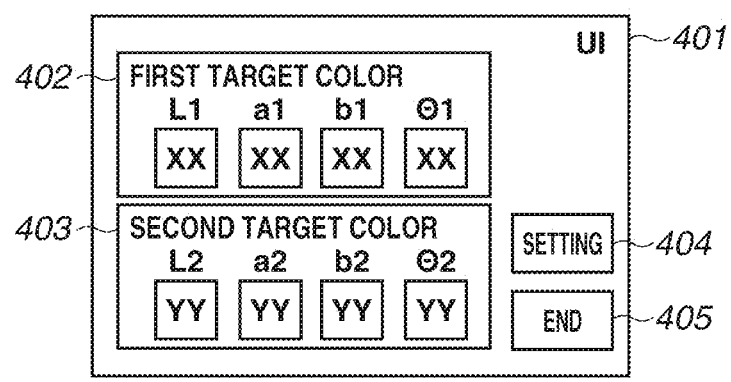

[Fig. 9B]
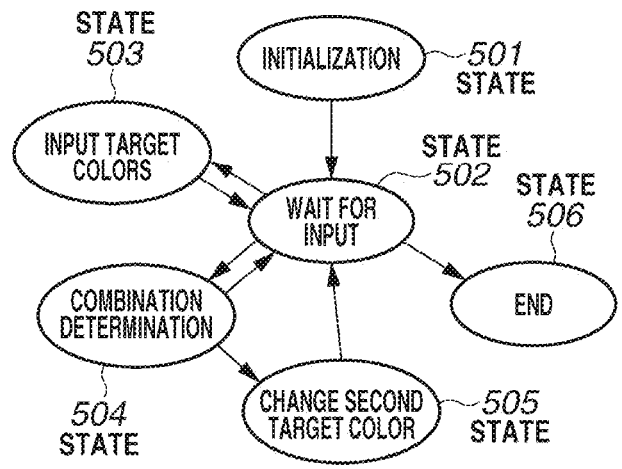
[Fig. 9C]
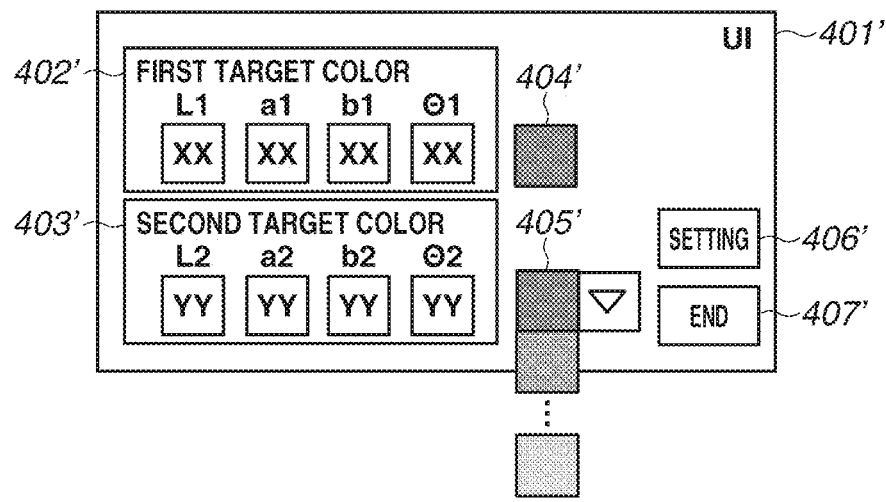
[Fig. 9D]
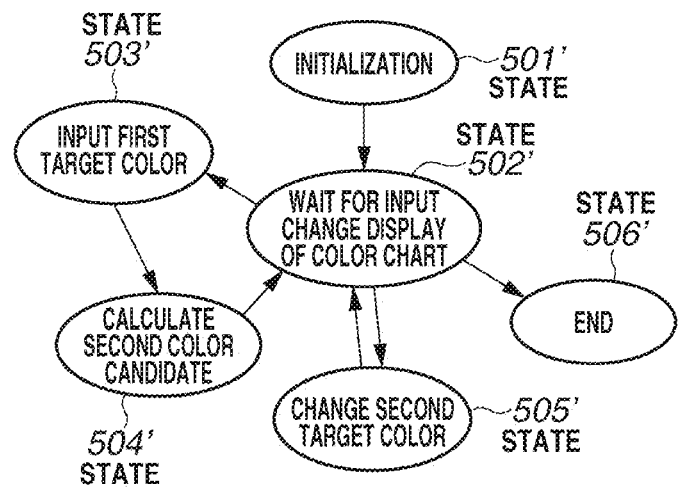

[Fig. 10A]
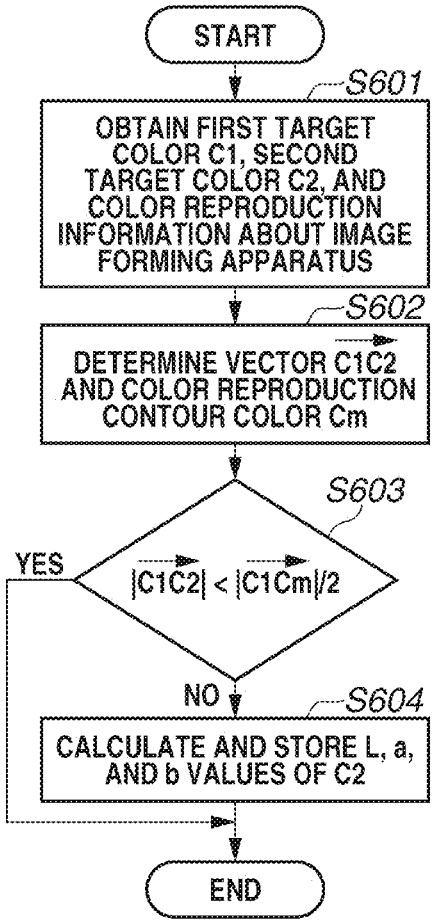

[Fig. 10B]
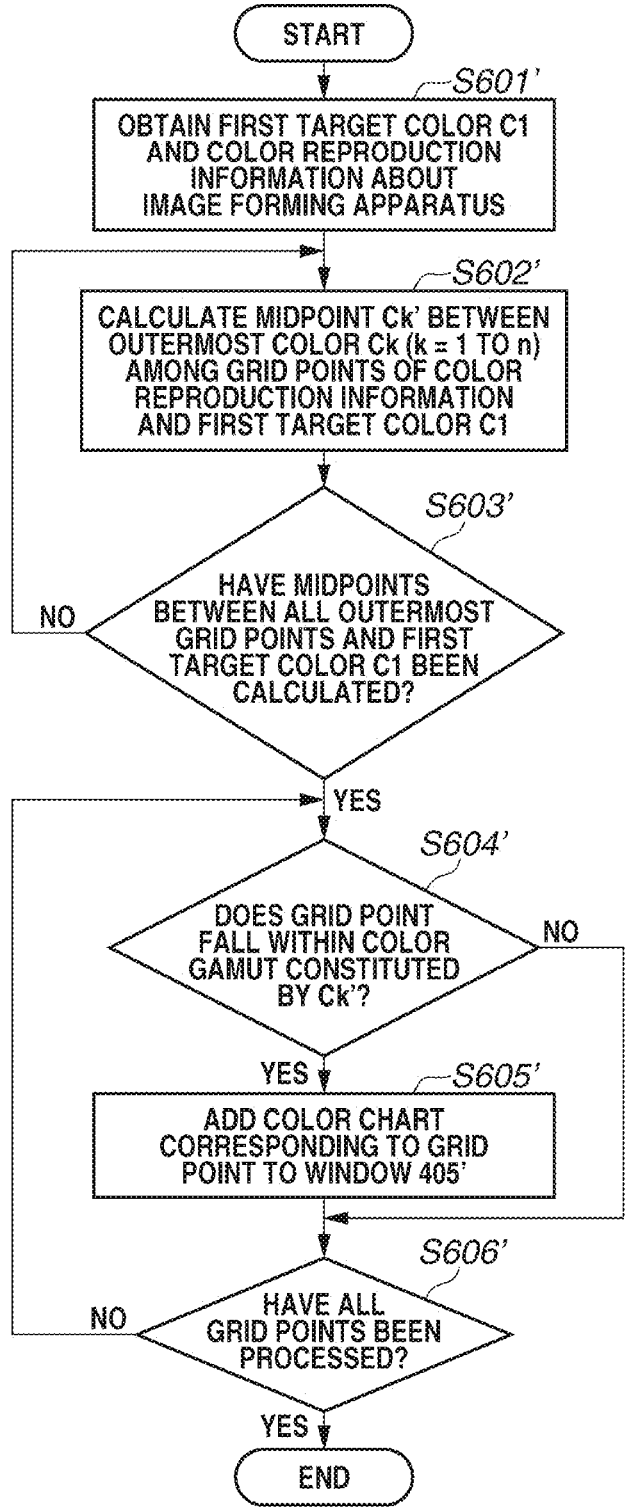

[Fig. 11A]
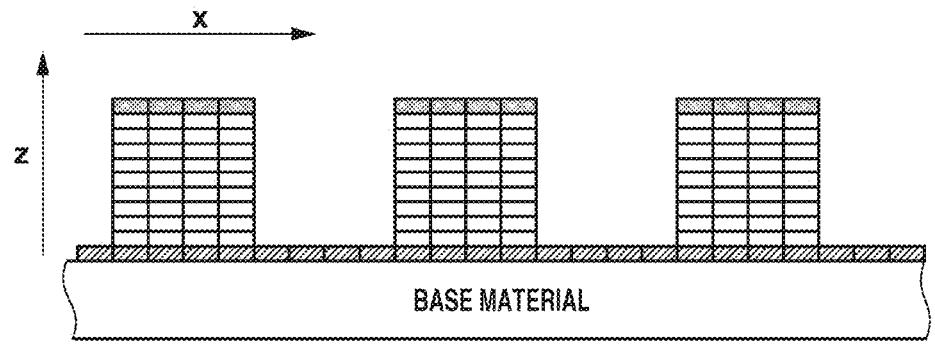
[Fig. 11B]
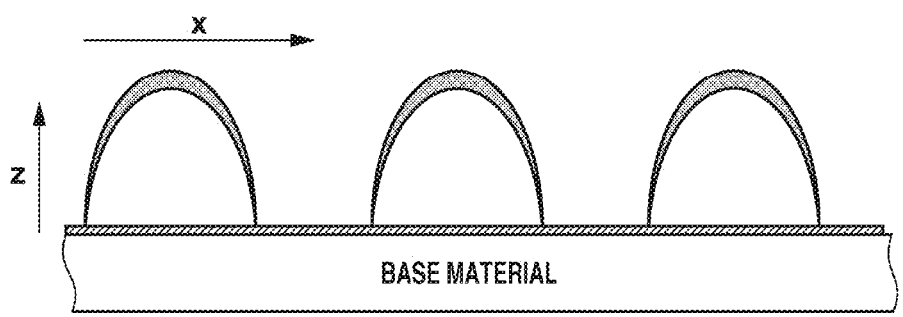
[Fig. 11C]
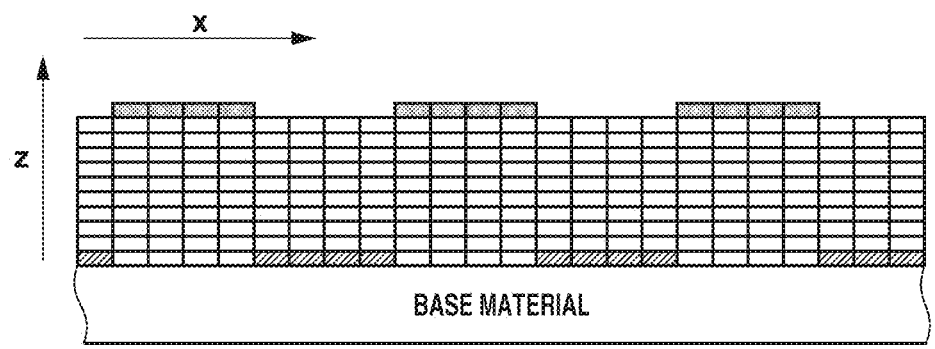
[Fig. 11D]
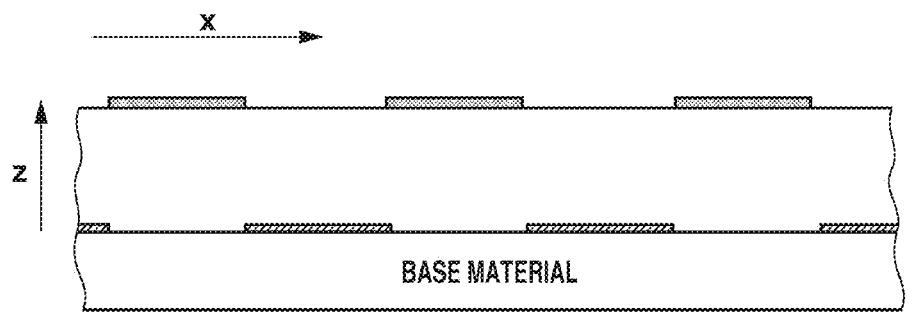

PRINT PRODUCT, IMAGE PROCESSING APPARATUS, IMAGE PROCESSING METHOD, AND PROGRAM

CROSS REFERENCE TO RELATED APPLICATIONS

The present application is a Continuation of U.S. patent application Ser. No. 15/757,319, filed on Mar. 2, 2018, which is a National Stage Entry of PCT/JP2016/004031, filed Sep. 5, 2016, and which claims priority to Japanese Patent Application No. 2015-177011 filed Sep. 8, 2015, all of which are hereby incorporated by reference herein in their entireties.

TECHNICAL FIELD

The present invention relates to color reproduction of an object that changes in color depending on a direction of observation.

BACKGROUND ART

Woven fabric, typified by velvet, has a fine complicated shape on the surface and thus has an anisotropic reflection characteristic of changing greatly in appearance as the angle of observation changes. A lenticular lens can be used to provide a typical anisotropic reflection characteristic. PTL1 has been discussed a technique for simultaneously forming a lenticular lens and an image adhering to the lenticular lens by using an ultraviolet (UV) curing inkjet printer that can discharge ink containing a light curing resin to form arbitrary projections and recesses.

According to the method using a lenticular lens, to smoothly change color with a change in the angle of observation, the adhering image needs to be printed in high resolution. The curved surface shape of the lenticular lens is difficult to accurately form in high resolution by using an inkjet printer as discussed in PTL1.

CITATION LIST

Patent Literature

[PTL 1]
Japanese Patent No. 3555420

SUMMARY OF INVENTION

Solution to Problem

The present invention is directed to obtaining an object having an anisotropic reflection characteristic without using a lenticular lens.

According to an aspect of the present invention, a print product including a print medium on which a repetitive structure of projected portions and recessed portions is formed out of image forming materials including a color material includes a first layer formed on surfaces of the projected portions out of a first color material among the image forming materials, and a second layer formed on the recessed portions out of a second color material different from the first color material, wherein the projected portions have a height to occlude part of the second layer when observed at an angle different from an angle formed by a normal to a surface of the print medium.

According to another aspect of the present invention, a print product includes a first layer formed in a layer form on a print medium out of a first color material, and a second layer formed in a layer form on the print medium out of a second color material different from the first color material, wherein the first layer and the second layer are alternately arranged on a plane of the print medium, and wherein the first layer is formed at a distance in a normal direction of a print surface of the print medium, the distance being such that part of the second layer is occluded when the first layer is observed at an angle different from an angle formed by a normal to the print surface of the print medium.

According to yet another aspect of the present invention, an image processing apparatus includes a first acquisition unit configured to obtain a first observation direction and first color information about an object in the first observation direction, a second acquisition unit configured to obtain a second observation direction and second color information about the object in the second observation direction, the second color information being different from the first color information, a third acquisition unit configured to obtain unevenness data expressing a repetitive structure of projected portions and recessed portions on a print medium, and a determination unit configured to determine an amount of a color material to be formed in the recessed portions and an amount of a color material to be formed in the projected portions based on the unevenness data, the first color information, and the second color information.

Further features of the present invention will become apparent from the following description of exemplary embodiments with reference to the attached drawings.

BRIEF DESCRIPTION OF DRAWINGS

FIG. 1 is a block diagram of an image forming apparatus according to a first exemplary embodiment.

FIG. 2 is a configuration diagram of a printer unit according to the first exemplary embodiment.

FIG. 3A is a schematic diagram for describing an operation for forming an uneven layer and an image layer according to the first exemplary embodiment.

FIG. 3B is a schematic diagram for describing an operation for forming an uneven layer and an image layer according to the first exemplary embodiment.

FIG. 3C is a schematic diagram for describing an operation for forming an uneven layer and an image layer according to the first exemplary embodiment.

FIG. 3D is a schematic diagram for describing an operation for forming an uneven layer and an image layer according to the first exemplary embodiment.

FIG. 3E is a schematic diagram for describing an operation for forming an uneven layer and an image layer according to the first exemplary embodiment.

FIG. 4A is a schematic diagram illustrating a structure of the uneven layer and the image layer according to the first exemplary embodiment.

FIG. 4B is a schematic diagram illustrating a structure of the uneven layer and the image layer according to the first exemplary embodiment.

FIG. 4C is a schematic diagram illustrating a structure of the uneven layer and the image layer according to the first exemplary embodiment.

FIG. 4D is a schematic diagram illustrating a structure of the uneven layer and the image layer according to the first exemplary embodiment.

FIG. 5A is a block diagram illustrating a functional configuration of the image forming apparatus according to the first exemplary embodiment.

FIG. 5B is a block diagram illustrating a functional configuration of an image forming apparatus according to a second exemplary embodiment.

FIG. 6 is a schematic diagram illustrating a configuration of input image data input according to the exemplary embodiments.

FIG. 7A is a flowchart illustrating an operation of the image forming apparatus according to the first exemplary embodiment.

FIG. 7B is a flowchart illustrating an operation of the image forming apparatus according to the first exemplary embodiment.

FIG. 8 is a diagram illustrating an example of an unevenness pattern obtained in the second exemplary embodiment.

FIG. 9A is a diagram illustrating a user interface according to a third exemplary embodiment.

FIG. 9B is a diagram illustrating a state transition according to a third exemplary embodiment.

FIG. 9C is a diagram illustrating a user interface according to a third exemplary embodiment.

FIG. 9D is a diagram illustrating a state transition according to a third exemplary embodiment.

FIG. 10A is a flowchart illustrating target color setting processing according to the third exemplary embodiment.

FIG. 10B is a flowchart illustrating target color setting processing according to the third exemplary embodiment.

FIG. 11A is a schematic diagram illustrating a cross section of a print product formed after processing according to the exemplary embodiments.

FIG. 11B is a schematic diagram illustrating a cross section of a print product formed after processing according to the exemplary embodiments.

FIG. 11C is a schematic diagram illustrating a cross section of a print product formed after processing according to the exemplary embodiments.

FIG. 11D is a schematic diagram illustrating a cross section of a print product formed after processing according to the exemplary embodiments.

DESCRIPTION OF EMBODIMENTS

Exemplary embodiments of the present invention will be describe in detail below with reference to the drawings.

First Exemplary Embodiment

A first exemplary embodiment describes an image forming apparatus and method in which two observation directions and color information when an image is observed in the respective directions are input as information about anisotropy, and surface unevenness and a color image are formed according to the information.

Hardware Configuration of Image Forming Apparatus

FIG. 1 is a block diagram illustrating a hardware configuration of the image forming apparatus. In FIG. 1, a host 700 serving as an image processing apparatus is a computer, for example. The host 700 includes a microprocessor (central processing unit (CPU)) 701 and a memory 702 such as a random access memory. The host 700 also includes an input unit 703 such as a keyboard, and a read-only memory (ROM) 704 such as a hard disk drive. The host 700 further includes a communication interface (hereinafter, referred to as a "printer interface (I/F)") 705 with a printer unit 800 serving as an image forming unit, and a communication interface (hereinafter, "video I/F") 706 with a monitor 900.

The CPU 701 executes various types of processing to be described below according to programs that are read from the ROM 704 and stored in the memory 702. Such programs are stored in the ROM 704 or supplied from an external apparatus (not illustrated). The host 700 makes the monitor 900 output various types of information via the video I/F 706, and inputs various types of information via the input unit 703. The host 700 is connected to the printer unit 800 via the printer I/F 705. The host 700 transmits a signal generated by processing to be described below to the printer unit 800 to make the printer unit 800 perform recording, and receives various types of information from the printer unit 800.

Schematic Configuration of Printer Unit

FIG. 2 is a configuration diagram of the printer unit 800 described in the present exemplary embodiment. The printer unit 800 is assumed to be an inkjet printer which records a shape and color by using ink, an image forming material. A head cartridge 801 includes a recording head including a plurality of discharge ports, and ink tanks which supply ink to the recording head. The head cartridge 801 further includes a connector for receiving a signal for driving the discharge ports of the recording head.

In the following description, a layer that expresses an unevenness shape, which is a repetitive structure of projected portions and recessed portions, and a layer that expresses the color of an image will be referred to as an uneven layer and an image layer, respectively. The printer unit 800 includes a total of five types of independent ink tanks. The ink tanks are intended for a clear ink for forming the uneven layer, and cyan, magenta, yellow, and block color inks for forming the image layer. Such inks are UV curing inks which cure when irradiated with ultraviolet rays.

The head cartridge 801 is positioned to and replaceably mounted on a carriage 802. The carriage 802 includes a connector holder for transmitting a driving signal to the head cartridge 801 via the connector. A ultraviolet irradiation unit 815 is mounted on the carriage 802. The ultraviolet irradiation unit 815 is controlled to irradiate discharged inks with ultraviolet rays so that the inks cure and firmly adhere to a recording medium (print medium). The carriage 802 is configured to be able to reciprocate along guide shafts 803. Specifically, the carriage 802 is driven and controlled in position and movement by a main scanning motor 804 as a driving source, via a driving mechanism including a motor pulley 805, a driven pulley 806, and a timing belt 807. The movement of the carriage 802 along the guide shafts 803 will be referred to as a "main scan." The moving direction will be referred to as a "main scanning direction."

Recording media 808 such as printing sheets are stacked on an auto sheet feeder (ASF) 810. During image formation, pickup rollers 812 are rotated to rotate by a sheet feed motor 811 via gears, whereby the recording media 808 are separated and fed from the ASF 810 one by one. Each recording medium 808 is conveyed by rotation of a conveyance roller 809 to a recording start position facing a discharge port surface of the head cartridge 801 on the carriage 802. The conveyance roller 809 is driven via gears by a line feed (LF) motor 813 as a driving source.

Whether the recording medium 808 is fed is determined and the fed position of the recording medium 808 is fixed when the recording medium 808 passes a paper end sensor 804. The head cartridge 801 mounted on the carriage 802 is held so that the discharge port surface protrudes downward from the carriage 802 and lies in parallel with the recording medium 808. A control unit 820 includes a CPU and a storage unit. The control unit 820 receives image data including an observation condition and color information under the condition from outside, and controls an operation of various parts of the printer unit 800 based on the received image data.

Operation for Forming Uneven Layer and Image Layer

An operation by which the inkjet printer having the configuration illustrated in FIG. 2 forms an uneven layer and an image layer will be described below. To form an uneven layer, a recording medium 808 is initially conveyed to a predetermined recording start position. The carriage 802 moves over the recording medium 808 along the guide shafts 803, and the clear ink is discharged from the discharge ports of the recording head during the movement. The ultraviolet irradiation unit 815 emits ultraviolet rays according to the movement of the recording head to cure the discharged clear ink so that the clear ink firmly adheres onto the recording medium 808. If the carriage 802 reaches an end of the guide shafts 803, the conveyance roller 809 conveys the recording medium 808 by a predetermined amount in a direction perpendicular to the main scanning direction of the carriage 802. Such conveyance of the recording medium 808 will be referred to as "paper feed" or "sub scan." The conveyance direction will be referred to as a "paper feed direction" or "sub scanning direction." If the predetermined amount of conveyance of the recording medium 808 ends, the carriage 802 moves along the guide shafts 803 again. In such a manner, the scanning of the recording head by the carriage 802 and the paper feed are repeated to form an uneven layer over the entire recording medium 808. After the formation of the uneven layer, the conveyance roller 809 returns the recording medium 808 to the recording start position. The cyan, magenta, yellow, and black color inks are discharged onto the uneven layer by a similar process to that of the formation of the uneven layer, whereby an image layer is formed.

In the present exemplary embodiment, for ease of description, the recording head is described to be basically controlled in two values, i.e., whether to discharge an ink droplet. This applies to both the clear ink and the color inks. In the present exemplary embodiment, such an ink on/off control is performed with respect to each of pixels defined by output resolution of the printer unit 800. A state where all pixels in a unit area are turned on will be regarded as an ink amount of 100%. Typical recording heads are able to modulate the discharge amount of ink. Such a recording head can be used if the foregoing binarization processing is extended to multi-value conversion processing into a plurality of levels capable of modulation. The present exemplary embodiment is therefore not limited to binarization.

During the formation of the uneven layer in the present exemplary embodiment, the concept of the ink amount described above is used to perform a height control in each position. If, in the formation of the uneven layer, an almost uniform layer is formed with an ink amount of 100%, such a layer has a thickness or height according to the volume of the discharged ink. Suppose, for example, that a layer formed with an ink amount of 100% has a thickness of 15 μm. In such a case, a thickness of 75 μm can be reproduced by stacking five layers. That is, the ink amount to be applied to a position where a height of 75 μm is needed is 500%.

FIGS. 3A to 3E are diagrams for describing an operation in which the recording head scans over the recording medium 808 to form an uneven layer and an image layer.

A main scan by the carriage 802 forms a layer as much as a width L of the recording head. Each time one line of recording ends, the recording medium 808 is conveyed by a distance L in the sub scanning direction. For ease of description, suppose that the printer unit 800 in the present exemplary embodiment can only discharge ink up to an ink amount of 100%. To form a layer exceeding an ink amount of 100%, the same region is scanned a plurality of times without conveyance. For example, if the amount of ink to be applied is 500% at the maximum, the same line is scanned five times. Referring to FIGS. 3A and 3B, the recording head scans a region A five times (FIG. 3A) before the recording medium 808 is conveyed in the sub scanning direction and the main scan of a region B is repeated five times (FIG. 3B).

To suppress deterioration of image quality such as periodic variations due to driving accuracy of the recording head, a plurality of scans may be performed even with an ink amount of 100% or less. In other words, multipath printing may be performed. FIGS. 3C to 3E illustrate an example of two-path recording. In this example, an image as much as the width L of the recording head is formed by a main scan of the carriage 802. Each time one line of recording ends, the recording medium 808 is conveyed by a distance of L/2 in the sub scanning direction. A region A is recorded by an mth main scan (FIG. 3C) and an (m+1)th main scan (FIG. 3D) of the recording head. A region B is recorded by the (m+1)th main scan (FIG. 3D) and an (m+2)th main scan (FIG. 3E) of the recording head. While a two-path recording operation is described here, the number of paths for recording may be changed according to desired accuracy. To perform n-path recording, for example, the recording medium 808 is conveyed in the sub scanning direction by a distance of L/n each time one line of recording ends. In such a case, a print pattern even with an ink amount of 100% or less is divided into a plurality of print patterns, and the recording head performs n main scans over the same line of the recording medium to form an uneven layer or an image layer. In the present exemplary embodiment, to avoid confusion of such scans for multipath printing with scans for applying ink of more than 100%, multipath printing is assumed not to be performed, and a plurality of scans will be described to be intended to stack layers. In the present exemplary embodiment, the recording medium 808 is not limited in particular. Various types of materials such as paper and a plastic film may be used as long as the materials are capable of image formation by the recording head.

Structure of Formed Print Product

FIGS. 4A to 4D are schematic diagrams illustrating an example of a structure of a print product formed by the image forming apparatus according to the present exemplary embodiment. FIG. 4A illustrates unevenness data and color data on an xy two-dimensional plane. Recessed portions and projected portions are alternately arranged in an x-axis direction. In FIG. 4A, the printed surface shows a vertical line pattern when seen in a front view.

FIG. 4B illustrates uneven shape data on an xz plane, i.e., a sectional structure of FIG. 4A. In the present exemplary embodiment, the printer resolution is approximately 600 dots per inch (dpi), with a width of 40 μm per dot. The projected portions are formed by repeating four dots, and the recessed portions are formed by repeating four dots. One cycle of unevenness is 320 µm. In this example, one layer has a thickness of 15 µm. The projected portions are formed by stacking ten dots in the z direction, with a height of 150 µm. Such a fine uneven layer is not visually recognizable to the observer, and appears to be a flat print product such as paper and cloth.

FIG. 4C is a diagram illustrating an example of the structure of a print product obtained by outputting the uneven shape data illustrated in FIG. 4B by the image forming apparatus. If the image forming apparatus illustrated in FIG. 2 described above prints the uneven shape data illustrated in FIG. 4B, the shape illustrated in FIG. 4C is formed. In the process of forming the uneven shape by the image forming apparatus, the discharged UV curing ink wets and spreads over the recording medium in the plane directions during a period between impact and the curing by the UV irradiation. As illustrated in 4C, the finally-formed uneven shape has a frequency lower than that of the uneven shape data illustrated in FIG. 4B. The uneven shape illustrated in FIG. 4C is just an example. An uneven shape having a high frequency close to that of FIG. 4A can be formed, for example, by using high viscosity ink having a low degree of wetting and spreading.

FIG. 4D is a schematic diagram for describing a mechanism by which the print product formed by the present exemplary embodiment develops anisotropy. As described above, the print product does not have an exactly rectangular shape. For ease of description, the uneven shape will be assumed to be rectangular. An observation direction can be expressed by a rotation angle θ and an elevation angle φ. In the present exemplary embodiment, the rotation angle θ is assumed to be 0 degrees. That is, assuming that the surface of the recording medium is an xy two-dimensional plane, the direction indicating that the rotation angle θ is 0 degrees is assumed to be parallel to the x-axis. The elevation angle φ is defined so that the vertical direction (normal) to the foregoing two-dimensional plane forms an angle of φ=0 degrees. Such a value will be used as angle information in input processing to be described below.

If the elevation angle φ=0 degrees, color is visually observable in the entire region including the surfaces of the image layers on the projected portions and the recessed portions. If the observation direction is changed to an elevation angle of φ=45 degrees, part of the recessed portions are occluded by the projected portions and does not become visually observable since the projected portions are separated from the recessed portions in the normal direction. The top surfaces of the projected portions are not occluded.

An ink amount Vφ per unit area observable in the observation direction (elevation angle) φ can be expressed by the following equation:

[Math. 1]

$$V\phi = \frac{b \cdot Vtop + (a - b - c \cdot \tan(\phi)) \cdot Vbot}{a - c \cdot \tan(\phi)}, \quad \text{Eq. (1)}$$

where Vtop is the ink amount per unit area of the image layer on the projected portions, Vbot is the ink amount per unit area of the image layer on the recessed portions, a is the width of one cycle of unevenness, b is the width of a projected portion, and c is the height of the projected portion. The denominator of the equation is equal to the area of one cycle of unevenness, observed in the observation direction φ. The first and second terms of the numerator represent the area ratio between the image layer on a projected portion and the observable image layer on a recessed portion. c×tan(φ) in the second term takes account of the area that is not observable because of occlusion. If a−b−c×tan(φ) in the equation is negative, the recessed portions are not visible because of occlusion. The second term is then set to 0, so that only the projected portions are observed. The foregoing equation does not take the exposure of the side surfaces of the projected portions into consideration. The approximation by the foregoing equation is possible because the shape usually becomes dull as illustrated in FIG. 4C. If the area of occlusion varies greatly depending on the observation direction due to the dulling of the shape, i.e., the foregoing wetting and spreading characteristic, Vφ may be corrected by previously determining the amount of correction from a frequency response characteristic of the printer unit 800 in forming projections and recesses. If the area of occlusion does not vary greatly, Vφ does not need to be corrected.

[Math. 2]

$$V\phi = \frac{b \cdot Vtop + (a - b - F(c \cdot \tan(\phi))) \cdot Vbot}{a - F(c \cdot \tan(\phi))}, \quad \text{Eq. (2)}$$

where F is a function for correcting the amount of occlusion. A lookup table (LUT) may be used for correction.

For the sake of simplicity, suppose, for example, that the image layers use only the cyan ink C, and Vtop is 100% in the cyan ink C and Vbot is 0% in the cyan ink C. As illustrated in FIG. 4B, a, b, and c are assumed to be 320 µm, 160 µm, and 150 µm, respectively. In this case Vφ at an observation direction of φ=0 degrees, due to the occlusion component tan(φ)=0, is given, from Eq. (1), by:

[Math. 3]

$$V\phi = \frac{160 \cdot Vtop + (320 - 160 - 150 \cdot 0) \cdot Vbot}{320 - 150 \cdot 0} = \frac{Vtop + Vbot}{2}. \quad \text{Eq. (3)}$$

Since Vtop and Vbot can be observed with the same areas, Vφ of the entire area can be observed to be 50% in the cyan ink C.

Similarly, at an observation direction of φ=45 degrees, the occlusion component tan(φ)=1.0. Eq. (1) yields:

[Math. 4]

$$V\phi = \frac{160 \cdot Vtop + (320 - 160 - 150 \cdot 1) \cdot Vbot}{320 - 150 \cdot 1} = \frac{16 \cdot Vtop + Vbot}{17}. \quad \text{Eq. (4)}$$

That is, Vφ can be observed to be 16/17 that nearly equals to 94% in the cyan ink C. In other words, the print product illustrated in FIGS. 4A to 4D appears to be a flat plane when observed from a macroscopic viewpoint. As the elevation angle of the observation direction changes, the density of the cyan varies greatly. Such an appearance gives a velvet-like texture.

In the foregoing description, the cyan ink is described to be used by itself. However, the image forming apparatus is not limited to the cyan ink and may use ink colors that are used in a typical printer. The observable area ratio between the recessed portions and the projected portions can be changed to reproduce arbitrary anisotropy. For example, the projected portions may be 100% in cyan C, and the recessed portions may be 100% in magenta M. This can form a print product that changes from blue to magenta according to the observation direction.

Operation of Image Forming Apparatus

FIG. 5A is a block diagram illustrating a functional configuration of the image forming apparatus according to the first exemplary embodiment.

An input unit 101 obtains two observation directions and color information when an image is observed in the respective observation directions as image data. FIG. 6 is a schematic diagram illustrating a configuration of the image data input to the input unit 101. The image data has an arbitrary resolution. The image data is data having a total of eight channels, including a first observation direction $\varphi_1$, color information $R_{\varphi 1}$, $G_{\varphi 1}$, and $B_{\varphi 1}$ in the first observation direction $\varphi_1$, a second observation direction $\varphi_2$, and color information $R_{\varphi 2}$, $G_{\varphi 2}$, and $B_{\varphi 2}$ in the second observation direction $\varphi_2$ for each pixel. The pieces of color information $R_{\varphi 1}$, $G_{\varphi 1}$, $B_{\varphi 1}$, $R_{\varphi 2}$, $G_{\varphi 2}$, and $B_{\varphi 2}$ are red, green, and blue (RGB) values defined by a standard RGB color space (sRGB). Alternatively, RGB images defined by commonly-used Adobe RGB and Lab images compliant with the International Commission on Illumination (CIE) 1976 color space (CIELAB) may be used.

For example, the image data can be obtained by capturing images of an object under the two geometrical conditions illustrated in FIG. 6 and performing an affine transformation on the captured images into the same shape. Since the two geometric conditions are fixed, all the pixels have the same value in the channel of the first observation direction $\varphi_1$. All the pixels also have the same value in the channel of the second observation direction $\varphi_1$. In such a case, the information about the observation directions $\varphi_1$ and $\varphi_2$ may be stored as header information about the image data, and the image data may be configured as 6-channel data. The input unit 101 outputs the image data to a color material amount determination unit 103.

An unevenness data acquisition unit 102 obtains unevenness data previously stored in the memory 702, and outputs the unevenness data to the color material amount determination unit 103 and the printer unit 800. The unevenness data is a pattern of recesses and projections repeated in the x direction, such as illustrated in FIGS. 4A to 4D. As described above, in the present exemplary embodiment, the printer resolution is approximately 600 dpi, with a width of 40 μm per dot. The unevenness data has a projected portion width of 4 dots and a recessed portion width of 4 dots.

Requirements of the unevenness data will be described. As described above, to cause a print product to develop an anisotropic reflection characteristic, the image forming apparatus needs to utilize occlusion in which the recessed portions are occluded behind the protruded portions. If the image forming apparatus forms an uneven layer, the image forming apparatus needs a sufficient unevenness formation accuracy. As described above, the formed shape usually becomes dull, the characteristic of which is known to be expressed as a modulation transfer function (MTF), a frequency response characteristic. Typical examples of the MTF characteristic include deterioration of response of high frequency components. This refers to a phenomenon in which if a waveform having a certain difference between top and bottom levels, for example, a sine wave is input, a similar difference in level to that of the input is obtained at low frequencies but a difference between top and bottom levels decreases as the frequency increases. Without a difference between top and bottom levels, the shading by the projected portions is not available. The recesses and projections formed in the present exemplary embodiment therefore need to have a frequency at which sufficient response can be obtained. The unevenness data used in the present exemplary embodiment has a frequency of 75 dpi. The MTF of the image forming apparatus at 75 dpi is thus preferably 0.5 or more, for example. Because of the characteristics of human visual sensitivity, patterns of higher frequencies are less noticeable to the eye. A pattern having the highest frequency at which the MTF of the image forming apparatus reaches or exceeds a predetermined value (for example, 0.5) is preferably stored in the memory 702 in advance and used as the unevenness data.

The height of the projected portions for causing the shading by the projected portions will be described. For example, to obtain a large change in color between observation directions $\varphi=0$ degrees and $\varphi=45$ degrees, the recessed portions can be fully occluded at $\varphi=45$ degrees. The projected portions thus desirably have a height greater than or equal to the width of the recessed portions. Even if the projected portions have a height smaller than the width of the recessed portions, presence of occluded regions can develop anisotropy. The smaller the height, the smaller the difference in color between different observation directions, i.e., the weaker the anisotropy.

The color material amount determination unit 103 receives the image data from the input unit 101 and the unevenness data from the unevenness data acquisition unit 102. For one set of unevenness, two observation directions and two pieces of color information are provided. The image data is thus converted into image data having a resolution of 600/8=75 dpi in the x direction and a resolution of 600 dpi in the y direction. To convert the resolution of a plurality of observation directions $\varphi$ of high resolution into low resolution by the resolution conversion, the unit vectors in the respective directions can be simply averaged. For conversion from low resolution to high resolution, a commonly-used nearest neighbor method may be used. Resolution conversion processing of the color information can be performed by using a method commonly used in printers. A description thereof will thus be omitted. The color material amount determination unit 103 further calculates the ink amounts corresponding to the recessed portions and the projected portions from the input unevenness data and image data. The calculated ink amounts are converted into the amounts of C, M, Y, and K inks for each pixel defined by the printer resolution, and transmitted to the printer unit 800. Details of the calculation of the ink amounts will be described below.

The printer unit 800 forms an uneven layer by using the clear ink based on the unevenness data received from the unevenness data acquisition unit 102. The printer unit 800 forms an image layer on the uneven layer formed before, based on the amounts of the C, M, Y, and K inks for each pixel, received from the color amount determined unit 103.

FIG. 7A is a flowchart illustrating a flow up to the formation of an output product by the image forming apparatus according to the first exemplary embodiment.

In step S201, the input unit 101 obtains two observation directions and color information when an image is observed in the respective observation directions as image data.

In step S202, the unevenness data acquisition unit 102 obtains unevenness data, and transmits the unevenness data to the color material amount determination unit 103 and the printer unit 800.

In step S203, the color material amount determination unit 103 converts the resolution of the image data to a resolution based on the period of the unevenness data.

In step S204, the color material amount determination unit 103 converts the color information $R_{\varphi 1}$, $G_{\varphi 1}$, and $B_{\varphi 1}$, and $R_{\varphi 2}$, $G_{\varphi 2}$, and $B_{\varphi 2}$ into cyan, magenta, yellow, and black (CMYK) ink values $V\varphi_1$ and $V\varphi_2$, respectively. A commonly-used conversion method using an LUT may be used for the conversion from RGB into CMYK.

In step S205, the color material amount determination unit 103 calculates a projected portion ink amount Vtop and a recessed portion ink amount Vbot from the CMYK ink values $V\varphi_1$ and $V\varphi_2$ and observation directions $\varphi_1$ and $\varphi_2$. Vtop and Vbot can be calculated by simultaneous equations using Eq. (1). The CMYK ink value $V\varphi_1$ and the observation direction $\varphi_1$ calculated in step S204 are substituted into $V\varphi$ and $\varphi$ of Eq. (1). The CMYK ink value $V\varphi_2$ and the observation direction $\varphi_2$ similarly calculated are substituted into $V\varphi$ and $\varphi$ of Eq. (1). The two resulting equations are solved as simultaneous equations to calculate the projected portion ink amount Vtop and the recessed portion ink amount Vbot.

The projected portion ink amount Vtop and the recessed portion ink amount Vbot calculated here include CMYK ink values Ctop, Mtop, Ytop, and Ktop, and Cbot, Mbot, Ybot, and Kbot. Each CMYK ink value is usually used in the range of 0% to 100%. However, the foregoing simultaneous equations may yield a solution or solutions smaller than 0% or greater than 100%. This indicates that a print product that satisfies the input observation directions and color information cannot be obtained by CMYK ink values within the ranges of 0% to 100%. For example, a print product that looks white in a front view, or at $\varphi$=0 degrees, and black in an oblique view is not able to be obtained by the printing structure of the present exemplary embodiment. In such a case, processing for rounding values smaller than 0% to 0% and values greater than 100% to 100% can be included to obtain a print product close to a desired characteristic. If an image layer can be formed by applying more than 100% of CMYK inks, the rounding processing to 100% is not needed. If a solution deviates greatly from the range of 0% to 100%, the color material amount determination unit 103 may notify the user that the input condition is unsatisfiable, and may terminate the image formation processing.

In step S206, the color material amount determination unit 103 converts the projected portion ink amount Vtop and the recessed portion ink amount Vbot to ink amounts defined by the printer resolution, and transmits the resultant to the printer unit 800 as print data for image layer formation.

In step S207, the printer unit 800 forms an uneven layer based on the unevenness data.

In step S208, the printer unit 800 forms an image layer based on the print data for image layer formation.

In such a manner, a print product having the structure illustrated in FIG. 4 can be formed. The formed print product can develop desired anisotropic reflection.

As described above, the image forming apparatus according to the present exemplary embodiment can obtain an anisotropic print product by controlling unevenness and color of the print product.

In the present exemplary embodiment, the uneven layer is described to be formed first, and the image layer is described to then be formed on the uneven layer. Depending on the print position accuracy of the image forming apparatus, i.e., the landing accuracy of ink, the image layer may be not able to be formed on the recessed portions and the projected portions with high accuracy, and a desired result may fail to be obtained. In such a case, a first image layer may be formed over the entire recording medium with the recessed portion ink amount calculated in the present exemplary embodiment before the uneven layer and a protruded portion image layer are formed. FIG. 11A is a schematic diagram illustrating a relationship between the unevenness data and color data according to such a method. FIG. 11B is a conceptual diagram of a cross section of the formed print product. Such a method can make at least the relative position accuracy between the uneven layer and the recessed portion image layer (first image layer) negligible and provide a similar effect. If the projected portion image layer has a high optical transparency and is highly susceptible to the effect of the underlying image layer, a similar effect can be obtained by using white ink instead of the clear ink in forming the uneven layer. The reason is that white ink typically has a low optical transparency and is less susceptible to the effect of the underlying layer. The amounts of color inks for forming an image layer are usually calculated on the assumption that there is a white print medium on the background. The formation of the uneven layer with the white ink thus causes smaller changes in color development than with other color inks. If the color inks for forming the image layer have low transparency and can form an image layer without being affected by the background in color development, the ink for forming the uneven layer is not limited to clear ink or white ink.

In another structure, a similar effect may be obtained by making the surface of the print product almost flat, without a height difference in the uneven layer. FIG. 11C illustrates an example where a first image layer (lower image layer) is formed on part of the surface of the recording medium, an uneven layer of a constant thickness is formed thereon with clear ink, and a second image layer (upper image layer) is formed on part of the top of the uneven layer. FIG. 11D is a schematic diagram illustrating an example of a sectional structure thereof. In such an example, the area ratio between the three layers, namely, the upper image layer, the lower image layer, and the print medium serving as a base material varies according to a change in the observation direction. An anisotropic print product can thus be obtained.

The ink amount calculation processing of step S205 is described to include the processing for rounding a value smaller than 0% to a value of 0% and a value greater than 100% to a value of 100%. Instead of such processing, the processing may return to step S202 so that a pattern having a different area ratio between recessed and projected portions is used to generate unevenness data and ink color data satisfying the input condition.

The printer unit 800 of UV curing inkjet type is described as an example of the printer unit 800. However, any printer unit may be used as long as an uneven layer and an image layer can be formed according to the calculated unevenness data and print data.

The calculation of the ink amount $V\varphi$ by using Eq. (1) is described on the assumption that the light source at the time of observation is diffused light in all directions. However, the ink amounts of the projected portions and recessed portions may be multiplied by correction coefficients in consideration of light from a specific direction.

Second Exemplary Embodiment

The uneven layer formed in the first exemplary embodiment is described to have a groove structure that is arranged in a previously-set fixed pattern such as a vertical line pattern. A second exemplary embodiment describes a method for forming an uneven pattern based on input observation directions, thereby obtaining a print product that develops anisotropy. A configuration and operation of an image forming apparatus according to the present exemplary embodiment are similar to those of the first exemplary embodiment unless otherwise specified. A description thereof will be omitted.

FIG. 5B is a block diagram illustrating a functional configuration of the image forming apparatus according to the present exemplary embodiment.

An input unit 101' obtains, as image data, two observation directions and color information when an image is observed in the respective observation directions. In the first exemplary embodiment, the observation directions are described such that the rotation angle θ is fixed to 0 degrees and only the elevation angle φ is specified. In the present exemplary embodiment, the observation directions are input by using two parameters, the rotation angle θ and the elevation angle φ. The color information is similar to that of the first exemplary embodiment.

A vector operation unit 104' accepts the two observation directions from the input unit 101', and determines a directionality (unevenness directionality) θshape of unevenness data to be formed later. Like the first exemplary embodiment, the present exemplary embodiment also utilizes the shading of recesses and projections to develop anisotropy. For that purpose, at least two or more cycles of a plurality of recesses and projections is preferably repeatedly arranged in a peripheral region. The vector operation unit 104' then sets an unevenness directionality θshape in resolutions according to the periods of unevenness patterns in respective directions, used in an unevenness data acquisition unit 102' to be described below. For example, suppose that the unevenness data acquisition unit 102' uses unevenness patterns having a period of 8 pixels in terms of printer resolution. In such a case, the vector operation unit 104' generates image data having the unevenness directionality θshape in 600/(8×2)=37.5 dpi in both x and y directions. Like the first exemplary embodiment, the resolution conversion of the observation directions can be performed by averaging two-dimensional unit vectors (θ and φ). In the present exemplary embodiment, the unevenness directionality θshape is calculated by θshape=(θ$_1$+θ$_2$)/2. The purpose is to cause a large change in the amount of shading and develop high anisotropy as the viewpoint moves from observation direction 1 (θ$_1$ and φ$_1$) to observation direction 2 (θ$_2$ and φ$_2$). The vector operation unit 104' transmits the calculated unevenness directionality θshape to the unevenness data acquisition unit 102'.

The unevenness data acquisition unit 102' obtains unevenness data having a directionality close to the received unevenness directionality θshape of each pixel from unevenness data of a plurality of directionalities stored in the memory 702 in advance. The unevenness data acquisition unit 102' transmits the obtained unevenness data to a color material amount determination unit 103'.

The color material amount determination unit 103' calculates the CMYK ink amounts for recessed and projected portions in each period of unevenness like the first exemplary embodiment, based on the image data from the input unit 101' and the unevenness data from the unevenness data acquisition unit 102'. The color material amount determination unit 103' transmits the CMYK ink amounts to the printer unit 800.

FIG. 7B is a flowchart illustrated a flow up to the formation of an output product by the image forming apparatus according to the present exemplary embodiment.

In step S301, the input unit 101' obtains, as image data, two observation directions and color information when an image is observed in the respective observation directions. The input unit 101' transmits observation direction data to the vector operation unit 104', and color information data to the color material amount determination unit 103'.

In step S302, the vector operation unit 104' calculates the unevenness directionality θshape based on the two pieces of observation direction data.

In step S303, the unevenness data acquisition unit 102' obtains unevenness data based on the unevenness directionality θshape, and transmits the unevenness data to the color material amount determination unit 103' and the printer unit 800.

In step S304, the color material amount determination unit 103' converts the image data to image data having a resolution based on the period of the unevenness data.

In step S305, the color material amount determination unit 103' converts the color information $R_{φ1}$, $G_{φ1}$, and $B_{φ1}$, and $R_{φ2}$, $G_{φ2}$, and $B_{φ2}$ into CMYK ink values $Vφ_1$ and $Vφ_2$, respectively.

In step S306, the color material amount determination unit 103' calculates the projected portion ink amount Vtop and the recessed portion ink amount Vbot as well as the first exemplary embodiment, and converts the Vtop and the Vbot to ink amounts defined by the printer resolution, and transmits the resultant to the printer unit 800 as print data for image layer formation.

In step S307, the printer unit 800 forms an uneven layer based on the unevenness data.

In step S308, the printer unit 800 forms an image layer based on the print data for image layer formation.

FIG. 8 illustrates an example of the unevenness pattern obtained in the present exemplary embodiment.

As described above, the unevenness directionality θshape is set based on two observation directions of each input pixel. A print product having anisotropic reflection characteristics of different directionalities region by region can thus be obtained.

Third Exemplary Embodiment

The first and second exemplary embodiments have described the methods for forming a print product having an anisotropic reflection characteristic. A third exemplary embodiment describes a user interface for setting parameters for the formation of a print product.

User Interface 1

A method for specifying parameters by using a user interface instead of the input of image data in step S201 of the flowchart described in the first exemplary embodiment will be described.

The monitor 900 displays a user interface for having the user input information needed to perform image processing. FIG. 9A illustrates an example of the user interface.

An instruction input section 402 inputs instructions about color information and an angle of a first target color. An instruction input section 403 inputs instructions about color information and an angle of a second target color. A setting button 404 is a button for determining the settings of the target colors. An end button 406 is intended to execute an operation related to termination and close the user interface (UI).

Now, state transitions of the UI will be described with reference to the state transition diagram of FIG. 9B. Target color setting processing will be described below.

In state 501, initialization is performed and then a user interface 401 is displayed. The state transitions to state 502 to enter a wait for the user's input.

In state 502, if the user inputs instructions to the instruction input sections 402 and 403, the state transitions to state 503. If the user presses the setting button 404, the state transitions to state 504 to determine whether the target colors are reproducible. If the target colors are reproducible, the state transitions to state 501. If the target colors are not reproducible, the state transitions to state 505. In state 505, the second target color is changed, and the state transitions to state 501. If the user presses the end button 405, the state transitions to state 506.

The target color setting processing will be described below with reference to the flowchart of FIG. 10A.

In step S601, the input unit 101 obtains a first target color $C_1$ about which instructions are input from the instruction input section 402, a second target color $C_2$ about which instructions are input from the instruction input section 403, and color reproduction information about the information forming apparatus.

In step S602, the input unit 101 determines a vector $\overrightarrow{C_1C_2}$ and a color reproduction contour color $C_m$.

In step S603, the input unit 101 compares a scalar $C_1C_2$ and a scalar $C_1C_2/2$ in magnitude by the following Eq. (5). If the condition is not satisfied (NO in step S603), the processing proceeds to step S604. If the condition is satisfied (YES in step S603), the input unit 101 performs an operation related to termination.

[Math. 5]

$$|\overrightarrow{C_1C_2}| < \frac{|\overrightarrow{C_1C_m}|}{2} \quad \text{Eq. (5)}$$

In step S604, the input unit 101 calculates L, a, and b values of $C_2$ by the following equations, and stores the L, a, and b values in the memory 702. The input unit 101 performs an operation related to termination.

[Math. 6]

$$L_{C2} = \frac{(L_{Cm} + L_{C1})}{2} \quad \text{Eqs. (6)}$$
$$a_{C2} = \frac{(a_{Cm} + a_{C1})}{2}$$
$$b_{C2} = \frac{(b_{Cm} + b_{C1})}{2}$$

User Interface 2

The monitor 900 displays a user interface for having the user input information needed to perform image processing. FIG. 9C illustrates an example of the user interface.

An instruction input section 402' inputs instructions about color information and an angle of a first target color $C_1$. A display section 403' displays color information about a second target color $C_2$ that is being selected. A window 404' displays a color chart corresponding to the first target color $C_1$. A window 405' displays a color chart selected as the second target color $C_2$. A setting button 406' is a button for determining the settings of the target colors $C_1$ and $C_2$. An end button 407' is intended to execute an operation related to termination and close the UI.

Now, state transitions of the UI will be described with reference to the state transition diagram of FIG. 9D. The target color setting processing will be described below.

In state 501', initialization is performed and then a user interface 401' is displayed. The state transitions to state 502' to enter a wait for the user's input.

In state 502', if the user inputs instructions to the instruction input section 402', the state transitions to state 503'. If the user changes the color chart of the window 405', the state transitions to state 505'. In state 505', the second target color is changed, and the state transitions to state 502'. If the user presses the setting button 406', the target colors $C_1$ and $C_2$ are stored. If the user presses the end button 407', the state transitions to state 506'.

The target color setting processing will be described below with reference to the flowchart of FIG. 10B.

In step S601', the first unit 101 obtains the first target color $C_1$ about which instructions are input from the instruction input section 402' and the color reproduction information about the image forming apparatus.

In step S602', the input unit 101 determines a midpoint Ck' between an outermost color Ck (k=1 to n) among the grid points of the color reproduction information and the first target color $C_1$:

[Math. 7]

$$L_{Ck'} = \frac{(L_{Ck'} + L_{C1})}{2} \quad \text{Eqs. (7)}$$
$$a_{Ck'} = \frac{(a_{Ck'} + a_{C1})}{2}$$
$$b_{Ck'} = \frac{(b_{Ck'} + b_{C1})}{2}$$

In step S603', if the midpoints Ck' between all the outermost grid points and the first target color $C_1$ have been calculated (YES in step S603'), the processing proceeds to step S604'. If not (NO in step S603'), the processing jumps to step S602'.

In step S604', the input unit 101 determines whether each grid point of the color reproduction information falls within or outside the color gamut constituted by Ck'. If the grid point falls within the color gamut (YES in step S604'), the processing proceeds to step S605'. If not (NO in step S604'), the processing proceeds to step S606'.

In step S605', the input unit 101 adds a color chart corresponding to the grid point to the window 405'.

In step S606', if all the grid points have been processed (YES in step S606'), the input unit 101 performs an operation related to termination. If not (NO in step S606'), the processing jumps to step S604'.

While a midpoint Ck' between the first target color $C_1$ and an outermost color Ck is used as the corrected second target color $C_2$, it will be understood that intermediate colors therebetween may also be used as long as Eq. (1) is satisfied.

A color chart is used as an example of display of target color candidates. However, this is not restrictive. It will be understood that a color wheel and other displays may be used.

As described above, the foregoing user interfaces can be used to easily set target colors even if the user does not comprehend the characteristics of the image forming apparatus.

According to the foregoing exemplary embodiments, an object having an anisotropic reflection characteristic can be obtained without the use of a lenticular lens.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD) (trademark)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus that determines amounts of color materials to be recorded on an area having unevenness of a print medium, the image processing apparatus comprising:
    a first acquisition unit configured to obtain first color information;
    a second acquisition unit configured to obtain second color information; and
    a determination unit configured to determine an amount of a color material to be recorded on recessed portions of the area and an amount of a color material to be recorded on projected portions of the area based on the first color information and the second color information.

2. The image processing apparatus according to claim 1, wherein, in a print product formed based on the determined amounts of color materials, a first color expressed by the first color information is observed in a first observation direction and a second color expressed by the second color information is observed in a second observation direction different from the first observation direction.

3. The image processing apparatus according to claim 1, wherein, in a print product formed based on the determined amounts of color materials, a different color is observed depending on an elevation angle of a direction in which the print product is observed.

4. The image processing apparatus according to claim 1, wherein, in a print product formed based on the determined amounts of color materials, density of a color to be observed varies depending on an elevation angle of a direction in which the print product is observed.

5. The image processing apparatus according to claim 1, wherein a print product formed based on the determined amounts of color materials is a print product that expresses velvet-like appearance.

6. The image processing apparatus according to claim 1, wherein the area has a structure where recessed portions and projected portions are alternately arranged.

7. The image processing apparatus according to claim 1, wherein each of the first color information and the second color information is color information obtained by capturing images of an object in a plurality of directions.

8. The image processing apparatus according to claim 1, wherein each of the first color information and the second color information is color information specified via a user interface.

9. The image processing apparatus according to claim 1, further comprising a third acquisition unit configured to obtain unevenness data expressing a structure of the area,
    wherein the determination unit is further configured to determine the amounts of color materials based on the unevenness data.

10. The image processing apparatus according to claim 2,
    wherein the first acquisition unit is further configured to obtain a first parameter related to the first observation direction,
    wherein the second acquisition unit is further configured to obtain a second parameter related to the second observation direction, and
    wherein the determination unit is further configured to determine the amounts of color materials based on the first and second parameters.

11. The image processing apparatus according to claim 1, wherein the area is formed using clear ink or white ink.

12. An image processing method for determining amounts of color materials to be recorded on an area having unevenness of a print medium, the image processing method comprising steps of:
    obtaining first color information;
    obtaining second color information; and
    determining an amount of a color material to be recorded on recessed portions of the area and an amount of a color material to be recorded on projected portions of the area based on the first color information and the second color information.

13. A non-transitory computer-readable storage medium storing instructions that, when executed by a computer, cause the computer to perform an image processing method for determining amounts of color materials to be recorded on an area having unevenness of a print medium, the image processing method comprising steps of:
    obtaining first color information;
    obtaining second color information; and
    determining an amount of a color material to be recorded on recessed portions of the area and an amount of a color material to be recorded on projected portions of the area based on the first color information and the second color information.

\* \* \* \* \*